United States Patent
Cazoulat et al.

(10) Patent No.: US 8,638,678 B2
(45) Date of Patent: Jan. 28, 2014

(54) METHOD OF TRANSMITTING A VIDEO SEQUENCE TO A REMOTE TERMINAL

(75) Inventors: Renaud Cazoulat, Rennes (FR); Valérie Ledunois, Laille (FR); Vincent Roussillat, Noyal sur Vilaine (FR)

(73) Assignee: France Telecom, Paris (FR)

( * ) Notice: Subject to any disclaimer, the term of this patent is extended or adjusted under 35 U.S.C. 154(b) by 1423 days.

(21) Appl. No.: 12/274,914

(22) Filed: Nov. 20, 2008

(65) Prior Publication Data

US 2009/0141874 A1    Jun. 4, 2009

(30) Foreign Application Priority Data

Nov. 22, 2007    (FR) ...................................... 07 59240

(51) Int. Cl.
*H04J 1/16* (2006.01)

(52) U.S. Cl.
USPC .......... 370/252; 375/82; 375/85; 375/240.11; 375/240

(58) Field of Classification Search
None
See application file for complete search history.

(56) References Cited

U.S. PATENT DOCUMENTS

| 2005/0122345 A1 | 6/2005 | Kirn et al. ...................... 345/629 |
| 2005/0129018 A1* | 6/2005 | Casaccia et al. ............... 370/390 |
| 2007/0130167 A1* | 6/2007 | Day et al. ........................ 707/10 |

FOREIGN PATENT DOCUMENTS

EP    1 742 476 A1    6/2005

OTHER PUBLICATIONS

French Search Report from counterpart foreign Application No. 07/59240.

* cited by examiner

*Primary Examiner* — Dady Chery

(74) *Attorney, Agent, or Firm* — David D. Brush; Westman, Champlin & Koehler, P.A.

(57) ABSTRACT

A method is provided for transmission, by a server in a communication network, of a multimedia message, which includes a video sequence, to a remote terminal. The method includes detecting the video sequence in the message by the server, wherein the method includes the following additional steps: coding by the server of the video sequence in a scalable stream including a base layer and one or more refinement layers, when the video sequence is not already coded in such a stream, storage of at least one of the refinement layers in a storage server, and sending the base layer and of a link to recover the at least one duly stored refinement layer to the remote terminal.

8 Claims, 4 Drawing Sheets

METHOD OF TRANSMITTING A VIDEO SEQUENCE TO A REMOTE TERMINAL

CROSS-REFERENCE TO RELATED APPLICATIONS

None.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The present disclosure relates generally to the field of telecommunications, and more specifically to the messaging systems that can be used to send or receive multimedia messages containing video sequences. These messaging systems are, for example, electronic mail systems, or instantaneous messaging systems, or even multimedia messaging systems MMS.

BACKGROUND OF THE DISCLOSURE

The transmission of video sequences sent by multimedia messaging in a communication network is problematic because of the heavy load it generates on this network in terms of bit rate. This load leads to congestion on the network, which is all the greater when video sequences are sent in multiple-broadcast mode to recipients with mailboxes that are not always situated on the same messaging servers. Furthermore, the video files that correspond to these sequences, because of their large size, congest the servers and the mailboxes of their recipients.

The practice of sending video by multimedia messaging does, however, remain commonplace because it is simple for the users of this messaging system, and enables the latter to consult the video sequences that have been transmitted to them over the communication network linked to this messaging, even when subsequent to this transmission they are no longer connected to the communication network.

The current techniques for transmitting video sequences by multimedia messaging do not effectively resolve the problems of congestion of networks and users' mailboxes, while maintaining the simplicity of use of the multimedia messaging systems for the users.

In practice, certain techniques for sending video sequences by multimedia messaging in a communication network use a system for filtering the attachments of multimedia messages sent over this network. The duly filtered attachments are stored in a storage space of the communication network, and replaced by a link to this storage space or to another device that can be used to recover the corresponding data.

These techniques do not allow a user to easily consult the video sequences of the messages that he receives, since the user must download these sequences before being able to read them. Furthermore, the user has no overview of the video sequences in the messages received, telling him the contents of these sequences before downloading them, which effectively obliges him to download them in order to know their contents. The pre-download knowledge of the content of the video sequences in the messages received would therefore limit the number of video sequences downloaded and therefore the problems of congestion.

Other techniques for sending video sequences by multimedia messaging in a communication network compress these video sequences before transmitting them to their recipients. These techniques limit the congestion of the networks and recipients' mailboxes, but do not allow the recipients access to all the video sequences that have been initially sent to them.

Another method that avoids the congestion of the user mailboxes with multimedia attachments is proposed in the application US 2005/0122345. For this, the method consists, based on a specific application installed on a user's messaging system, in coding the content of a message to be sent which contains a multimedia attachment, in the form of a low-resolution content corresponding to the attachment, this low-resolution content incorporating a resource address URL, "Uniform Resource Locator". When a recipient receives such a message, he views the low-resolution content inserted into this message, and, if he wishes to see the corresponding multimedia content in full, all he has to do is to click this low-resolution content to access the server on which the corresponding multimedia content is stored in its original quality.

However, the decongestion of the networks and the mailboxes obtained by this method is limited: in practice when a recipient clicks on the resource address of a multimedia content that has been sent to him in low resolution, this recipient downloads a full version of this multimedia content. He will therefore have received and stored in all two files, a file corresponding to this low resolution multimedia content and a file corresponding to the full version of this multimedia content, instead of just one if he had directly received the full version of the multimedia content in the message addressed to him. Furthermore, this method requires a specific application on the messaging systems of the users sending video sequences.

SUMMARY

An aspect of the disclosure is directed to a method of transmission by a server in a communication network of a multimedia message comprising a video sequence to a remote terminal, said method comprising:
 - detection of said video sequence in said message by said server,
 - coding by said server of said video sequence in a scalable stream comprising a base layer and one or more refinement layers, when said video sequence is not already coded in such a stream,
 - storage of at least one of said refinement layers in a storage server,
 - and sending of said base layer and a link to recover said at least one duly stored refinement layer to said remote terminal.

Thanks to an aspect of the present disclosure, only the base layer and, possibly, a few refinement layers of a scalable version of this video sequence is transmitted over the communication network to the recipient of the video sequence. These layers enable the recipient to reconstruct this video sequence in a low-resolution version. The data transmitted over the network and stored in the recipient's mailbox are thus limited and make it possible to decongest the network compared to a conventional sending of video sequences in multimedia messages.

Moreover, the recipient also receives a link, for example to a storage server, which enables him to download refinement layers to reconstruct the video sequence in its initial quality, of better resolution than that corresponding to the video sequence received. Thus, in the case where the recipient wants to view the video sequence in its initial quality, he congests the network and his mailbox no more than he had directly received the initial version of this video sequence. In practice, the refinement layers are based on the data already received by the recipient to reconstruct the video sequence in its initial quality, the size of these layers is therefore less great than that of the initial version of the video sequence.

Finally, an aspect of the disclosure does not require the use of a specific application on the messaging systems of the users sending video sequences, since the possible coding of the video sequences sent by the users in a scalable stream is performed at the level of a server in the communication network. At the level of the remote terminal that receives the message transmitted by the inventive method, this terminal requires the integration of a scalable stream decoder to view the video sequence received in the low-resolution version. To view the video sequence received in full, it also requires a specific application to combine the downloaded refinement layers, but this application is, for example, downloaded automatically on receiving the message, with an applet.

The disclosure also relates to a method of reception of a multimedia message on a terminal in a communication network, said multimedia message comprising a video sequence coded in the form of a scalable stream comprising at least one base layer, characterized in that:
    said multimedia message comprises a link for recovering at least one refinement layer corresponding to said video sequence, and in that it comprises the steps of:
    transmission by said terminal of a download request to a storage server by using said link,
    reception by said terminal of said at least one refinement layer transmitted by said storage server in response to said request,
    and use by said terminal of said at least one refinement layer to display on a display screen a video sequence combining said at least one refinement layer with said at least one base layer.

The reception method according to an aspect of the disclosure presents the same advantages as the method of transmission according to the disclosure. It should be noted that the step of transmission by the terminal of a download request to recover the refinement layers stored on the storage server does not necessarily require an intervention from the user of the remote terminal. This step is, for example, performed automatically according to a configuration file in the remote terminal, taking into account the display capabilities of the terminal, and/or the user preferences.

According to an advantageous characteristic of the method of reception according to the disclosure, the transmission step is preceded by steps of:
    presentation of said video sequence coded in the form of a scalable stream comprising at least one base layer, and display of said link by said terminal on said display screen,
    and reception by said terminal of a command corresponding to the selection of said link by a user of said terminal.

This characteristic enables the user to have a preview of the video sequence received before authorizing the downloading of refinement layers to view this sequence in a better resolution.

According to another advantageous characteristic of the method of reception according to the disclosure, the display of said link corresponds to the display of the first image of said video sequence coded in the form of a scalable stream comprising at least one base layer, said link being stored in said first image by a steganography method.

The use of a steganography method to display the link offers better ergonomics, more instinctive, to the user. In effect, the latter is generally tempted to click on the first image of a video sequence that he wants to view when he estimates that the quality of the latter is unsatisfactory.

The disclosure also relates to a terminal provided with a display screen, and comprising means of receiving a multimedia message in a communication network, said multimedia message comprising a video sequence coded in the form of a scalable stream comprising at least one base layer, characterized in that:
    said video sequence is coded in the form of a scalable stream comprising at least one base layer,
    said multimedia message comprises a link for recovering at least one refinement layer corresponding to said video sequence,
and in that it comprises:
    means of transmission, by said terminal of a download request to a storage server by using said link,
    means of reception, by said terminal of said at least one refinement layer transmitted by said storage server in response to said request,
    and means of using, by said terminal, said at least one refinement layer to display on said display screen a video sequence combining said at least one refinement layer with said at least one base layer.

The disclosure also relates to a server in a communication network, comprising means of transmitting a multimedia message comprising a video sequence to a remote terminal, and means of detecting said video sequence in said message, characterized in that it comprises:
    means of coding said video sequence in a scalable stream comprising a base layer and one or more refinement layers, when said video sequence is not already coded in such a stream,
    means of storing at least one of said refinement layers in a storage server,
    and means of sending said base layer and a link to recover said at least one duly stored refinement layer to said remote terminal.

The disclosure also relates to a system of transmitting a multimedia message comprising a video sequence to a remote terminal, using a communication network, a storage server, and a server comprising means of detecting said video sequence in said message, characterized in that said server also comprises:
    means of coding said video sequence in a scalable stream comprising a base layer and one or more refinement layers, when said video sequence is not already coded in such a stream,
    means of storing at least one of said refinement layers in said storage server,
    and means of sending over said communication network said base layer and a link to recover said at least one duly stored refinement layer to said remote terminal.

The disclosure finally relates to a computer program comprising instructions stored on a computer-readable medium for implementing one of the methods presented above, when it is run on a computer.

The devices, the system and the computer program present advantages similar to those of the methods.

BRIEF DESCRIPTION OF THE DRAWINGS

Other characteristics and advantages will become apparent from reading of a preferred embodiment described with reference to the figures in which.

DETAILED DESCRIPTION OF ILLUSTRATIVE EMBODIMENTS

Figure 1:
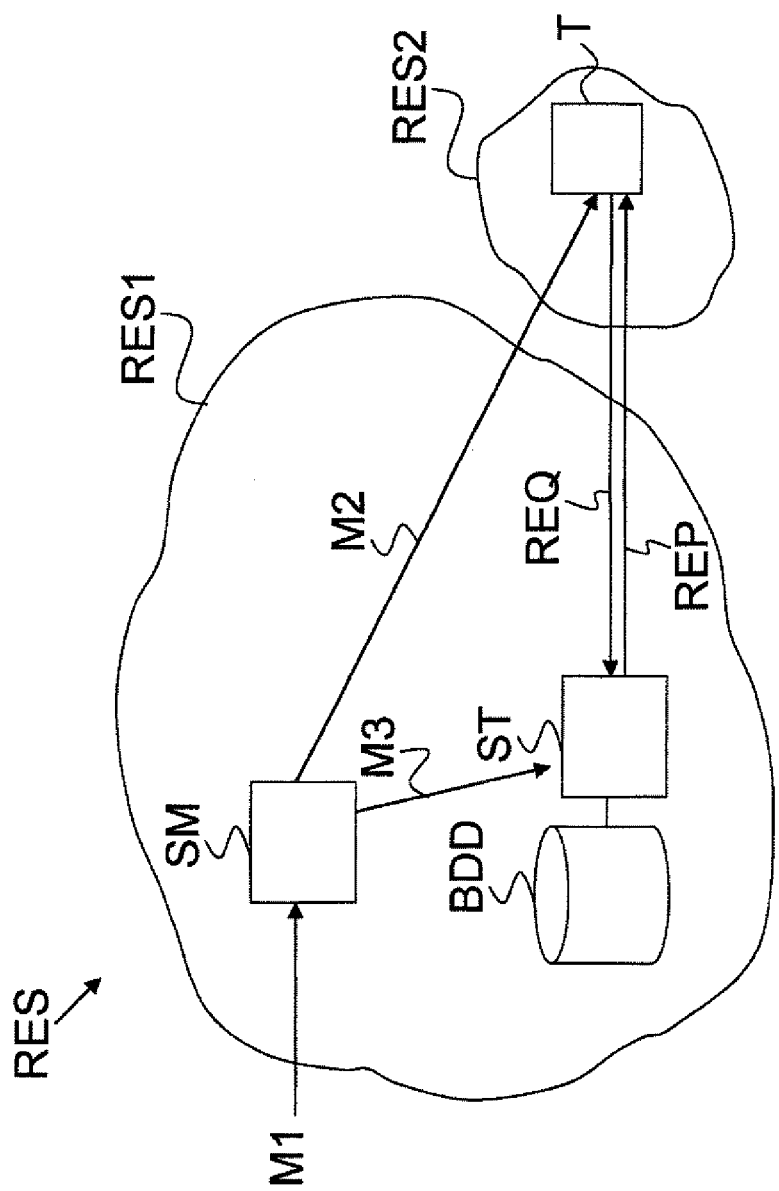
FIG. 1 represents a transmission system according to the present disclosure.

According to an exemplary embodiment of the present disclosure, the transmission system according to the disclosure uses a communication network RES, represented in FIG. 1. The communication network RES consists of several types of network, a core network RES1, which is, for example, the Internet network, and an access network RES2 to which is connected a terminal T. The network RES2 is, for example, the public switched telephone network PSTN, or a fiber optic wired network, or a WiFi network (Wireless Fidelity, according to the "Institute of Electronical and Electronics Engineers" (IEEE) standard 802.11), or even a so-called "3G" access network using the "Universal Mobile Telecommunications System" (UMTS) technology.

The transmission system according to an aspect of the disclosure comprises a messaging server SM, in which is implemented the transmission method according to the disclosure, and a storage server ST to which is connected a database BDD.

The messaging server SM is a multimedia messaging server that makes it possible to send or receive video sequences, for example an electronic mail server, or a messaging server MMS, or even an instantaneous messaging server. It implements the transmission method according to the disclosure in a software manner. In addition, or as an alternative to software means, the server SM possibly comprises electronic hardware means for implementing the transmission method according to the disclosure.

Figure 2:
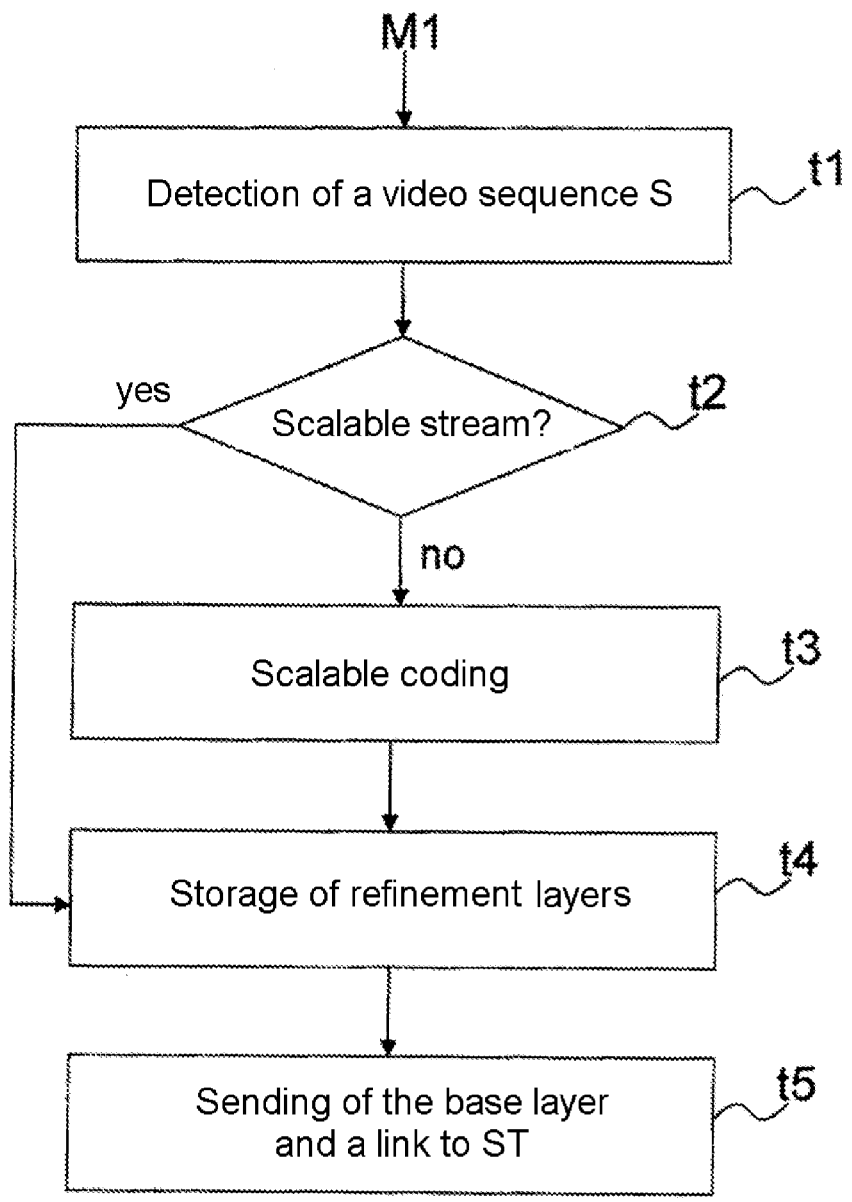
FIG. 2 represents the steps of the transmission method according to the present disclosure, as described in this embodiment.

The transmission method according to an aspect of the disclosure is now described in the form of an algorithm comprising steps t1 to t5, described with reference to FIG. 2.

The step t1 is the detection by the server SM of a video sequence S in the multimedia message M1, intended for the remote terminal T, which passes through the network RES via the server SM. This detection is done by the analysis of the file types attached to the message M1, for example the server SM detects all the files for which the extensions are "mpeg" according to the "Motion Picture Expert Group" standard, or "avi" according to the "Audio Video Interleave" format, or "mov" according to the "Quick Time" format, or "flv" according to the "Flash Video" format, or even "h264" according to the H.264 format.

The next step t2 is the analysis of the coding type used in the video sequence S detected in the step t1. More specifically, the server SM determines in this step t2 whether this coding is performed or not according to a scalable stream.

Figure 3:
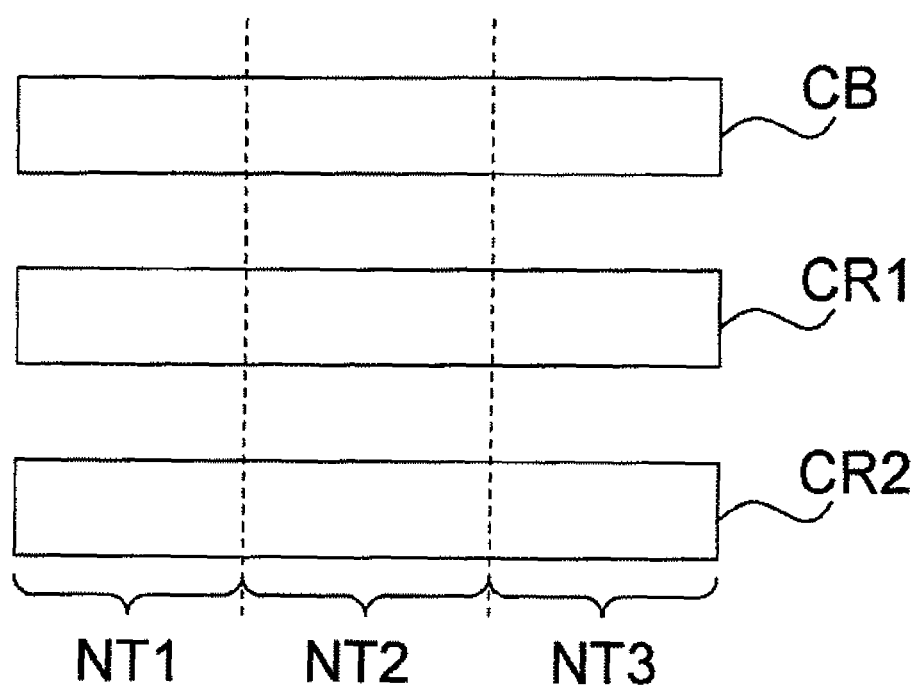
FIG. 3 represents an SVC video stream.

As a reminder, the techniques for coding video sequences according to a scalable stream compress the video stream to be coded according to a predictive and layered hierarchical scheme, the video stream is broken down into a base layer and one or several refinement layers, each being nested in a higher level layer, that is, the base layer or another refinement layer. Each layer combined with the information contained in the higher-level layer makes it possible to improve the frequency of the images of the decoded stream, its resolution and/or its quality. One of these techniques is, for example, the SVC, "Scalable Video Coding" standard, currently being standardized with the "Joint Video Team (JVT)", an alliance between the MPEG (Moving Picture Expert Group, ISO/IEC JTC1/SC29/WG11) standardization group and the ITU-T (International Telecommunications Union ITU-T SG16 Q.6), in the form of an extension of the ISO ("International Standards Organization") standard 14496-10, also called H.264/MPEG-4 AVC ("Advanced Video Coding"). An example of datastream compressed according to this standard is represented in FIG. 3. It consists of a base layer CB and two refinement layers CR1 and CR2, associated with the base layer CB. The refinement layers CR1 and CR2 code data that make it possible to raise the quality, the resolution or the frequency of the images coded by the base layer CB, which is, for example, a stream coded according to the AVC standard. The SVC standard also makes it possible to segment these layers CB, CR1 and CR2 into temporal levels NT1, NT2 and NT3.

In this step t2, the server SM therefore detects, for example, whether the video sequence S is coded according to the SVC standard. In this case, the next step is the step t4, otherwise the next step is the step t3.

In the step t3, the server SM has detected in the step t2 that the video sequence S is not coded according to a scalable stream. The step t3 is therefore the coding of this video sequence S according to a scalable stream according to the SVC standard. This coding corresponds to the conversion of the video sequence S from a coding format in a non-scalable stream, for example an MPEG2 format, to an SVC format, and therefore corresponds more specifically to a code conversion of this video sequence S. Since the starting format of the video sequence S and its arrival format are determined, this code conversion is performed without particular difficulties, according to techniques known to those skilled in the art.

At the end of this step t3 there is then obtained a video sequence S code converted in the form of a base layer and one or more refinement layers.

The next step t4 is the storage by the server SM of the refinement layers extracted from the video sequence S detected in the step t2, if this sequence was already coded according to a scalable stream, or from the code conversion of this video sequence S in the step t3, in the storage server ST. For this, the server SM sends a message M3 over the communication network RES to the storage server ST containing these refinement layers. On receiving the message M3, the storage server ST stores these refinement layers in the database BDD.

As a variant, the storage server ST is situated in the same physical entity as the server SM, and the sending of the message M3 over the communication network RES is not therefore necessary.

In another embodiment variant, if the initial or code converted video sequence S comprises several refinement layers, only one or a few higher level refinement layers are stored in the storage server ST. The determination of the refinement layers that must be stored in the storage server ST is then performed according to predetermined criteria, for example according to the maximum size of the message M2 to be sent in the step t5, or on the type of refinement provided by these layers (frequency, time or quality refinement).

Finally, the last step t5 is the sending by the server SM of a message M2 comprising the base layer extracted from the video sequence S detected in the step t2, if this sequence has already been encoded according to a scalable stream, or from the code conversion of this video sequence S in the step t3, over the communication network RES, to the remote terminal T. The message M2 also comprises a link for recovering the refinement layers stored in the step t4 in the storage server ST. This link is, for example, a resource address URL to the storage server ST, or another type of resource address URI, an English acronym standing for Universal Resource Identifier.

As an embodiment variant, this link is an identifier enabling the terminal T to recover the refinement layers stored in the storage server ST, the terminal T knowing in advance the address of the storage server ST.

In another embodiment variant, this link is an applet that, for example, performs an authentication of the user of the terminal T before downloading the refinement layers stored in the storage server ST. This embodiment variant eliminates the need for the terminal T to have installed on it or downloaded in advance a specific application for implementing the reception method according to an aspect of the disclosure.

Furthermore, if, as an embodiment variant, only one to a few higher-level refinement layers of the initial or code converted video sequence S have been stored in the storage server ST in the step t4, the message M2 comprises, in addition to the link and the base layer extracted from this initial or code-converted video sequence S, the lower-level refinement layers, also extracted, and which have not been stored in the step t4.

It should be noted that in this embodiment, the server SM detects and uses only the codings according to scalable streams conforming to the SVC standard, but it is also possible to incorporate the processing of other types of coding according to scalable streams by the server SM, notably the future evolutions of the SVC standard.

Figure 4:
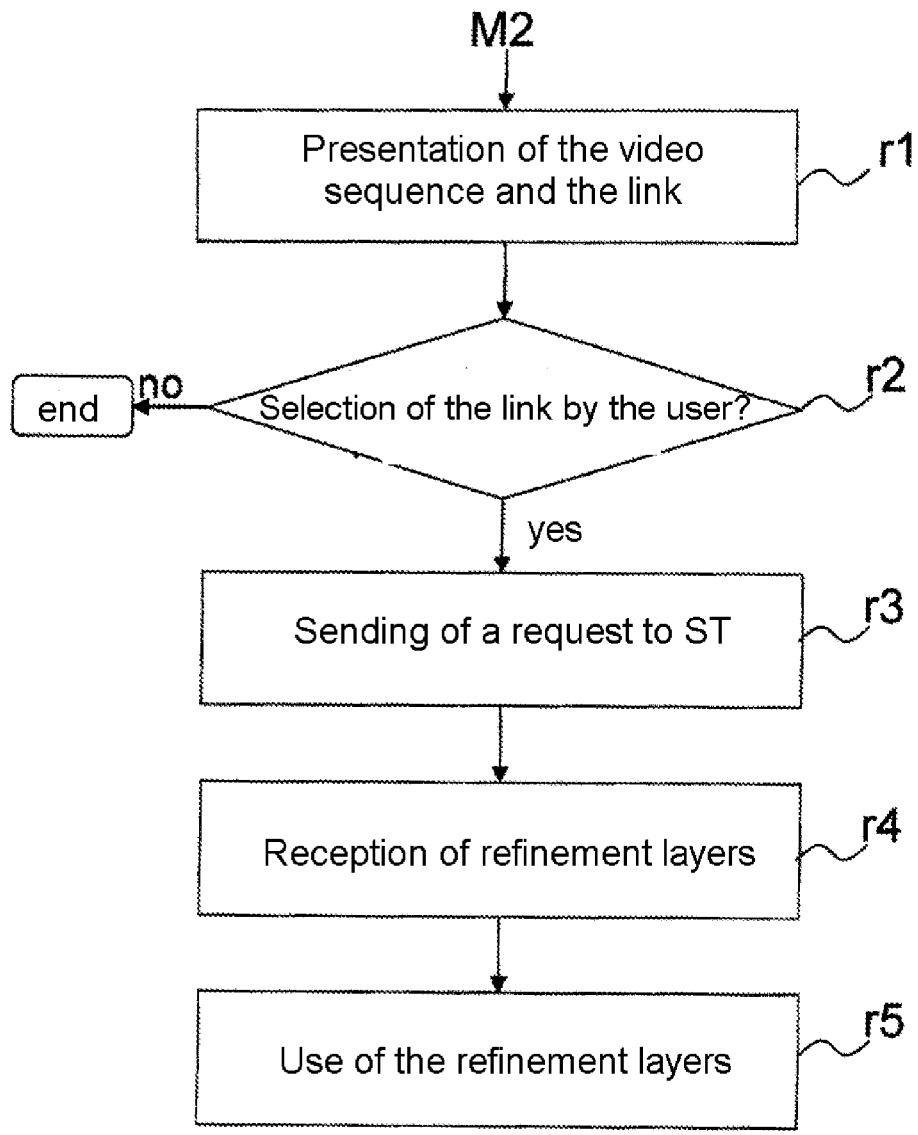
FIG. 4 represents steps of the method of reception according to the present disclosure, as described in this embodiment.

On receipt of the message M2 by the terminal T, the reception method is implemented in the terminal T. This method is now described in the form of an algorithm comprising steps r1 to r5, described with reference to FIG. 4.

The step r1 is the presentation, on a display screen of the terminal T, of a video sequence read from the base layer and, where appropriate, as a variant, from the refinement layers received in the message M2, to the user of the terminal T. This reading is performed using an SVC decoder in the terminal T, and stops, for example, after the first image of the video sequence has been read, the other images not being read until after the selection of a read key by the user. In this step r1, there is also displayed the link making it possible to recover the refinement layers stored in the storage server ST in the step t4, on the display screen.

It should be noted that the reading of the layer, or as a variant the layers, received in the message M2 produces a low-resolution video sequence, that is, a video sequence of lower resolution than that that would be obtained by combining this layer or, as a variant, these layers, with the refinement layers stored in the storage server ST. Furthermore, in this embodiment, the terminal T comprises an SVC decoder, but if, in other embodiments, the transmission method uses other types of codings according to scalable streams, then the terminal T comprises decoders compatible with these other coding types.

In this step r1, the reading of the video sequence and the display of the link is performed, for example, in a so-called "rich" interface of "Rich Media" type, which facilitates interactivity with the user. Furthermore, the display of the link is performed, for example, on the display of the first image of the video sequence, by a steganography method. For example, if the link is a resource address URL, the latter is typically coded in the lowest-order bits of this first image. This function of restoration of the URL must then be coded in the "Rich Media" type interface.

The next step r2 depends on the selection or otherwise of the link displayed in the step r1 by the user of the terminal T, for example by clicking on the first image of the video sequence presented on the display screen for reading. If the user does not select this link but wants to view the video sequence presented on the screen, the latter is read in low-resolution version from the base layer and, possibly, as a variant, from other refinement layers received in the message M2. If, on the contrary, the user selects this link, then in this step r2 the terminal T receives the command to select this link, and the next step is the step r3.

As a variant, the terminal T contains a configuration file that makes it possible to determine in which cases the link displayed must be used to download or not download the refinement layers stored on the storage server ST. In this embodiment variant of the reception method, there is thus a direct switch from the step r1 to the step r3, without involving the step r2. This configuration file stores, for example, data concerning the capabilities of the terminal T, and/or the preferences of the user, to determine in which context the refinement layers stored on the storage server ST must be downloaded. The context depends, for example, in addition to the capabilities of the terminal, on the senders of the message M1, on the user's type of connection, on keywords contained in the subject of the message M1, or on a "status" of the user. The capabilities of the terminal include, for example, a profile and levels defined by the SVC standard, with which the terminal T is compatible. The profile indicates with which tools of this standard the SVC decoder of the terminal is compatible, whereas the levels refine, for each tool, the level of compatibility of the decoder.

The step r3 is the transmission by the terminal T of a download request REQ to the storage server ST. This request uses the link received in the message M2, for example it is an http (Hyper Text Transfer Protocol) "GET" message which specifies the resource address URL at which the refinement layers to be downloaded are located.

The next step r4 is the reception by the terminal T of the refinement layers transmitted by the storage server ST in response to the request REQ, in a response message REP, for example an http "POST" message.

Finally, the last step r5 is the use by the SVC decoder of the refinement layers received in the step r4 to combine them together with the base layer received in the message M2. The SVC decoder thus reads and displays on the display screen a video sequence of higher resolution than the low-resolution video sequence corresponding to the reading of the base layer received in the message M2.

As a variant, if the message M2 received by the terminal contains a base layer and one or more refinement layers, then in this step r5 the SVC decoder combines the refinement layers received in the step r4 together with the layers received in the message M2. The video sequence obtained by this combination is also of higher resolution that the video sequence corresponding to the reading of the layers received in the message M2.

Furthermore, it should be noted that the use of a "Rich Media" interface to present the content of the message M2 to the user, makes it possible to automatically sequence the end of the downloading of the refinement layers stored on the server ST in the step r4, with the reading of the video sequence using these layers in the step r5.

An exemplary embodiment of the disclosure resolves the drawbacks of the prior art by providing methods and devices making it possible to send a user a low-resolution version of a video sequence that is transmitted to him in a multimedia message, while enabling this user to view the corresponding video sequence in full if he wishes. In the latter case, the video sequence in full is supplied to the user without greatly congesting the communication network to which the user is connected.

Although the present disclosure has been described with reference to one or more examples, workers skilled in the art will recognize that changes may be made in form and detail without departing from the scope of the disclosure and/or the appended claims.

What is claimed is:

1. Method of transmission by a server in a communication network of a multimedia message comprising a video sequence to a remote terminal, said method comprising:
    detection of said video sequence in said message by said server,
    coding by said server of said video sequence in a scalable stream comprising a base layer and one or more refinement layers, when said video sequence is not already coded in such a stream,
    storage of at least one of said refinement layers in a storage server, and
    sending said base layer and a link to said at least one stored refinement layer to said remote terminal, wherein the link is configured to enable the remote terminal to recover the at least one stored refinement layer from the server.

2. Method comprising:
    reception of a multimedia message on a terminal in a communication network, said multimedia message comprising a video sequence coded in the form of a scalable stream comprising at least one base layer, wherein said multimedia message comprises a link to at least one refinement layer corresponding to said video sequence,
    transmission by said terminal of a download request for said at least one refinement layer to a storage server by using said link,
    reception by said terminal of said at least one refinement layer transmitted by said storage server in response to said request, and
    use by said terminal of said at least one refinement layer to display on a display screen a video sequence combining said at least one refinement layer with said at least one base layer.

3. Method of reception of a multimedia message according to claim 2, wherein the transmission step is preceded by steps of:
    presentation of said video sequence coded in the form of a scalable stream comprising at least one base layer and display of said link by said terminal on said display screen, and
    reception by said terminal of a command corresponding to the selection of said link by a user of said terminal.

4. Method of reception of a multimedia message according to claim 3, wherein the display of said link corresponds to the display of a first image of said video sequence coded in the form of a scalable stream comprising at least one base layer, said link being stored inside said first image by a steganography method.

5. Terminal provided with a display screen, and comprising:
    means of receiving a multimedia message in a communication network, said multimedia message comprising a video sequence coded in the form of a scalable stream comprising at least one base layer, wherein said multimedia message comprises a link to at least one refinement layer corresponding to said video sequence,
    means of transmission, by said terminal of a download request for said refinement layer to a storage server by using said link,
    means of reception, by said terminal of said at least one refinement layer transmitted by said storage server in response to said request, and
    means of using, by said terminal, said at least one refinement layer to display on said display screen a video sequence combining said at least one refinement layer with said at least one base layer.

6. Server in a communication network, comprising:
    means of transmitting a multimedia message comprising a video sequence to a remote server,
    means of detecting said video sequence in said message,
    means of coding said video sequence in a scalable stream comprising a base layer and one or more refinement layers, when said video sequence is not already coded in such a stream,
    means of storing at least one of said refinement layers in a storage server, and
    means of sending said base layer and a link to said at least one stored refinement layer to said remote terminal, wherein the link is configured to enable the remote terminal to recover the at least one stored refinement layer from the server.

7. System of transmitting a multimedia message comprising a video sequence to a remote terminal, using a communication network, a storage server, and a server comprising means of detecting said video sequence in said message, wherein said server also comprises:
    means of coding said video sequence in a scalable stream comprising a base layer and one or more refinement layers, when said video sequence is not already coded in such a stream,
    means of storing at least one of said refinement layers in said storage server, and
    means of sending over said communication network said base layer and a link to said at least one duly stored refinement layer to said remote terminal, wherein the link is configured to enable the remote terminal to recover the at least one stored refinement layer from the server.

8. A non-transitory computer-readable medium comprising a computer program stored thereon and comprising instructions for implementing a method of transmission by a server in a communication network of a multimedia message comprising a video sequence to a remote terminal, when the instructions are run on a computer, said method comprising:
    detecting said video sequence in said message by said server,
    coding, by said server, said video sequence in a scalable stream comprising a base layer and one or more refinement layers, when said video sequence is not already coded in such a stream,
    storing at least one of said refinement layers in a storage server, and
    sending of said base layer and a link to said at least one stored refinement layer to said remote terminal, wherein the link is configured to enable the remote terminal to recover the at least one stored refinement layer from the server.

* * * * *